United States Patent

Voin

[15] 3,648,090

[45] Mar. 7, 1972

[54] DYNAMO-ELECTRIC MACHINE

[72] Inventor: Robert Voin, 1 rue Charcot, Saint Priest en Jarot, France

[22] Filed: Dec. 24, 1969

[21] Appl. No.: 888,011

[30] Foreign Application Priority Data

Dec. 26, 1968 France..........................266

[52] U.S. Cl..................................310/191, 310/43, 310/62, 310/113
[51] Int. Cl. ..........................................H02k 3/00
[58] Field of Search.................310/191, 266, 162, 119, 113, 310/140, 148, 154, 262, 43, 63, 64, 239, 257, 241, 62; 74/527; 85/50 AT; 285/362

[56] References Cited

UNITED STATES PATENTS

| | | | |
|---|---|---|---|
| 583,264 | 5/1897 | Lundell | 310/257 |
| 1,160,364 | 11/1915 | Baekeland | 310/43 |
| 2,832,908 | 4/1958 | Abbott | 310/266 |
| 3,079,518 | 2/1963 | Moore | 310/115 |
| 3,388,458 | 6/1968 | Logan | 310/43 |
| 3,396,288 | 8/1968 | Patrignani | 310/154 |
| 3,416,300 | 12/1968 | Schenkel | 310/266 |
| 2,950,404 | 8/1960 | Nolte | 310/241 |
| 3,217,197 | 11/1965 | Sturzenegger | 310/62 |
| 3,480,813 | 11/1969 | Sillano | 310/241 |

Primary Examiner—L. T. Hix
Assistant Examiner—R. Skudy
Attorney—Waters, Roditi, Schwartz & Nissen

[57] ABSTRACT

A dynamo-electric machine or motor having rotor windings and commutator blades embedded in insulating material rotatable in an airgap defined between external and internal magnetic circuit portions, the rotor position being adjustable through the use of surface cams or shims and the airgap width being adjustable by shims, the rotor being internally cooled by way of apertures in said rotor and channels in the internal magnetic circuit portion, the rotor being reinforced by filaments binding the rotor conductors and a central, radially deformable, bush, commutator brushes being carried by holders radially slidably mounted on an angularly adjustable support and accessible externally of the motor, and magnetic field producing elements being at the internal portion of the circuit and/or being provided by a permanent or electromagnetic tubular member with L-shaped pole pieces.

23 Claims, 25 Drawing Figures

Patented March 7, 1972 3,648,090

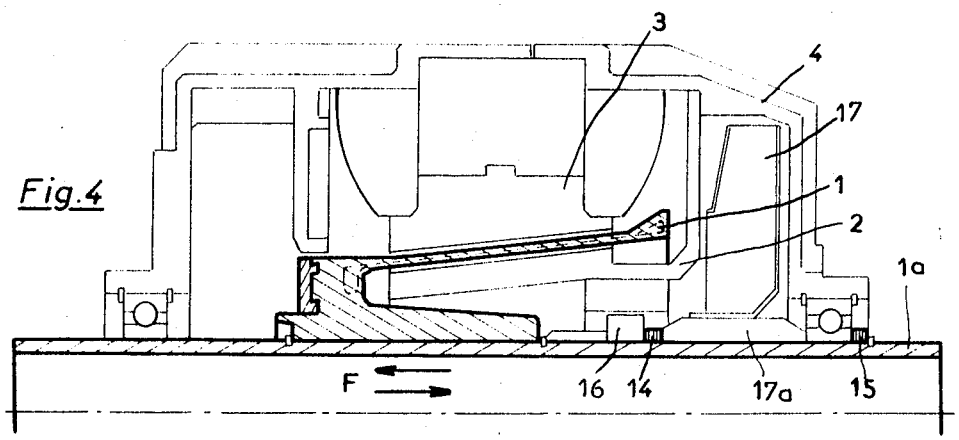
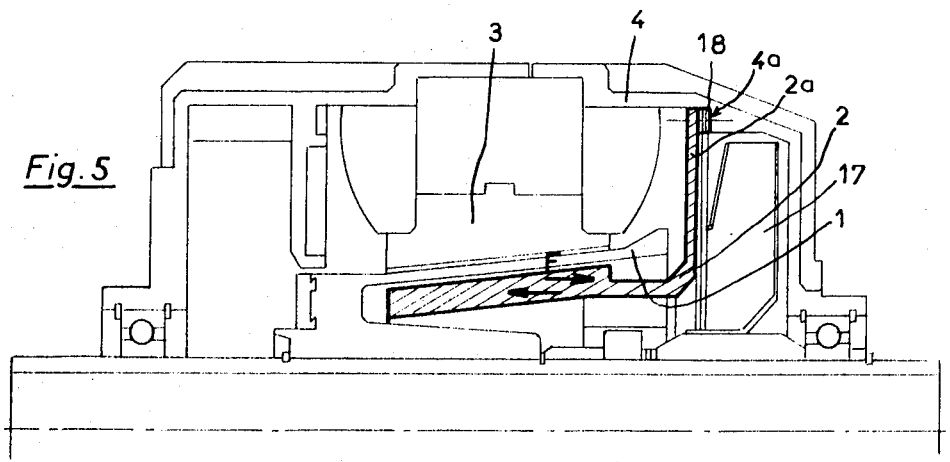
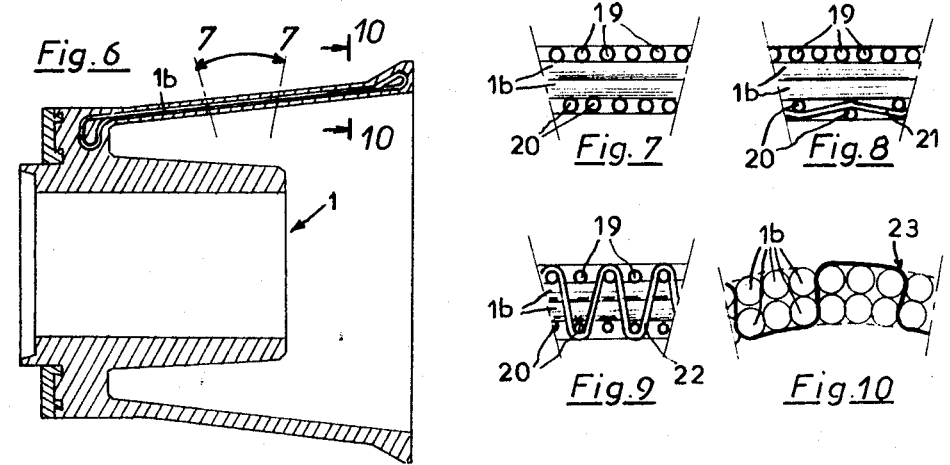

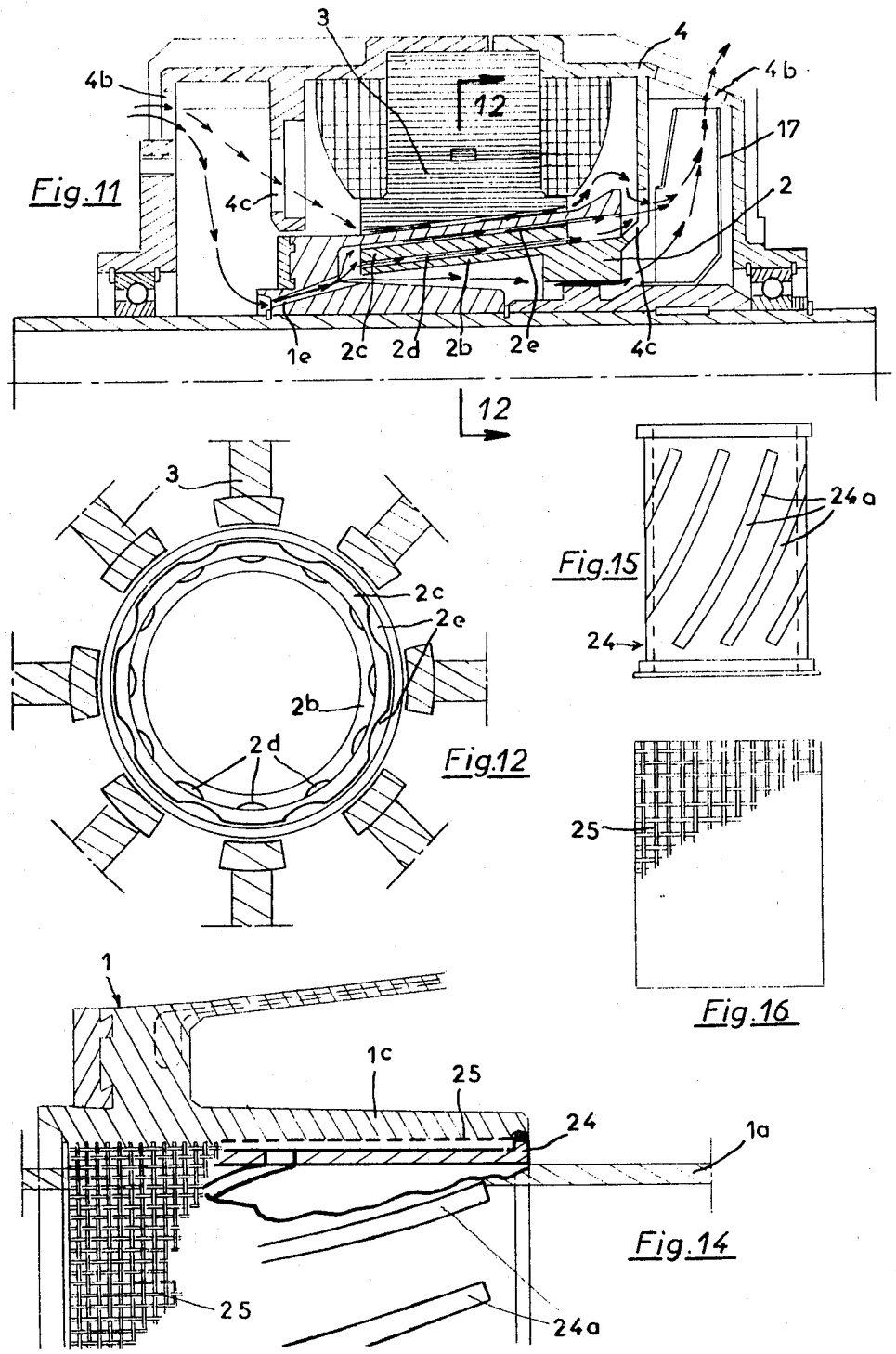

Patented March 7, 1972

Patented March 7, 1972 3,648,090

DYNAMO-ELECTRIC MACHINE

The invention relates to dynamoelectric machines, such as motors of the "spindle-motor" type for control of the spindles of machine tools, and more particularly, but not exclusively, to electric machines according to U.S. Pat. No. 3,396,288.

The electric machine according to the said patent comprises, on the one hand, a rotor with rotor windings and commutator blades embedded in a coating of insulating material, such as synthetic resin, in which is disposed an inner sleeve, and, on the other hand, a magnetic circuit defining an airgap in which the rotor is disposed, the circuit having a portion external of the rotor and an internal portion within the rotor and free to rotate with or relative to the sleeve or fixed in relation to the external portion, one of said portions having stator poles or other magnetic field producing means.

According to one aspect of the invention, there is provided a dynamoelectric machine having a rotor and a stator and means for adjusting said rotor relative to said stator, these means comprising:

a first member held against angular movement relative to said rotor and against axial movement relative to said stator and having a first surface portion inclined relative to the axis of rotation of said rotor;

a second member angularly movable relative to said rotor and held against axial movement relative to said rotor and having a second surface portion inclined relative to said axis and juxtaposed with said first surface portion whereby relative angular movement of said members varies the relative position of said rotor and stator: and means for securing said members against relative angular motion in any of a plurality of relative angular positions. Said surface portions may thus be formed as surface cams.

According to an alternative aspect of the invention, these adjusting means comprise two groups of shims in respective gaps defined between portions fixed axially of said rotor and portions fixed axially of said stator, whereby moving a shim from one of said groups to the other changes the relative position of said rotor and said stator.

According to a third aspect of the invention, there is provided a dynamoelectric machine comprising:

a rotor having a hollow cylindrical tapering portion;

a stator having an external portion surrounding said rotor portion and an internal portion within said rotor portion defining between said stator portions an airgap of cylindrical tapering form in which said rotor is rotatable; and removable shims by way of which said internal portion is mounted relative to said external portion so that the width of said airgap is determined by the number of said shims.

According to a fourth aspect of the invention, there is provided a dynamoelectric machine comprising:

a rotor of moulded insulating material;

rotor windings embedded in said insulating material; and at least one binding filament wound at an angle to the conductors of said windings and binding said rotor at at least one side of said windings.

Preferably a filament(s) extend(s) at both sides of the conductors. An internal binding may, for example, be reinforced by a transverse filament(s) which interlace(s) the filament(s) of the binding. Also a reinforcing filament(s) may interlace the filaments of the external and internal bindings. A reinforcing filament(s) may bind the rotor conductors by interlacing them and crossing them at intervals.

According to a fifth aspect of the invention, there is provided a dynamoelectric machine comprising:

a housing containing apertures to provide ventilation paths within said housing;

a fan for producing ventilation currents through said paths; and a rotor which is hollow and is apertured to provide one of said paths within said rotor.

When the magnetic circuit of the machine has an internal portion within the rotor, this portion is preferably formed of two parts, one within the other and defining between them cooling channels extending generally axially of the machine. Ventilation grooves may also or alternatively be formed in the external or internal surface of the internal portion of the magnetic circuit.

According to a sixth aspect of the invention, there is provided a dynamoelectric machine comprising:

a first stator;

a first rotor;

a cooling fan for setting up ventilation currents in said machine; and a subsidiary motor defined by a subsidiary stator and a subsidiary rotor rotatable independently of said machine for driving said fan. The rotor of the subsidiary motor may be of tapering form with such an apex angle that its axial length is short in comparison with that of the first rotor of the machine.

According to a seventh aspect of the invention, there is provided a dynamoelectric machine comprising:

a rotor of moulded insulating material; and a bush about which said rotor has been moulded and which is radially deformable to receive a drive member. To achieve deformability, the bush may have regularly distributed slots, preferably of helical form, the ends of which are closed at at least one end of the bush. A lattice-form bush may be secured about the aforementioned bush before it is moulded to the rotor.

The bush may be moulded to the rotor at the same time as the rotor is moulded, whereafter the bush may be bored out before the shaft or sleeve is fitted therein. Alternatively, the shaft or sleeve may be secured in the bush before the bush is moulded to the rotor.

According to an eighth aspect of the invention, there is provided a dynamoelectric machine comprising:

a commutator;

brushes;

members carrying said brushes;

a support for said members having slideways from which said members are radially removable and said support being angularly adjustable relative to said commutator;

interengageable portions of said support and members providing electrical connections to said brushes; and a machine housing defining apertures through which said members are removable.

According to a ninth aspect of the invention, there is provided a dynamoelectric machine comprising:

a hollow rotor;

a magnetic circuit having a first portion surrounding said rotor and a second portion within said rotor and defining with said first portion an airgap in which said rotor is rotatable; and magnetic field producing means provided by said second portion.

The first portion may be incorporated in or provide a frame or housing for the machine.

The second portion may be of cruciform cross section with radial arms, possibly carrying windings, and pole pieces at the ends of the arms.

According to a 10th aspect of the invention there is provided a dynamoelectric machine comprising:

a rotor; and a stator having at one radial side of said rotor a tubular magnet and two pairs of opposed L-shaped arms each having a radial portion extending substantially radially from said magnet followed by portions extending with an axial component, said radial portions of one of said pairs being at one end region of said magnet and said radial portions of the other of said pairs being at the other end region of said magnet.

The magnet may be a permanent magnet or an electromagnet with a single energizing coil.

For a better understanding of the invention, and to show how the same may be carried into effect, reference will now be made, by way of example, to the accompanying drawings in which:

FIG. 4 illustrates in axial half-section alternative adjusting means;

FIG. 5 illustrates in axial half-section an arrangement for adjusting the motor airgap;

Figure 13:
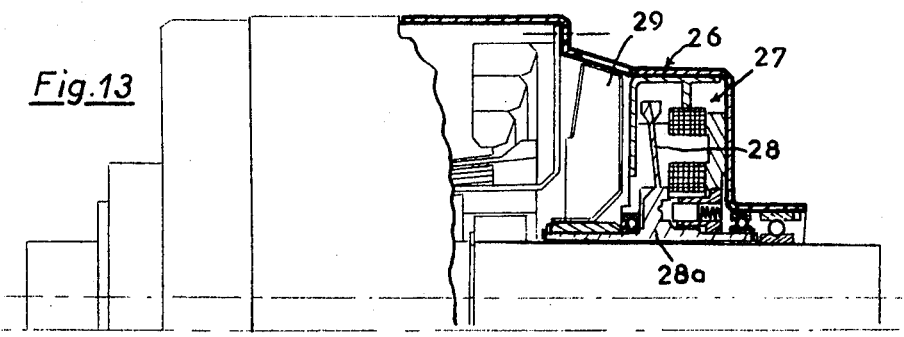
Figure 19:
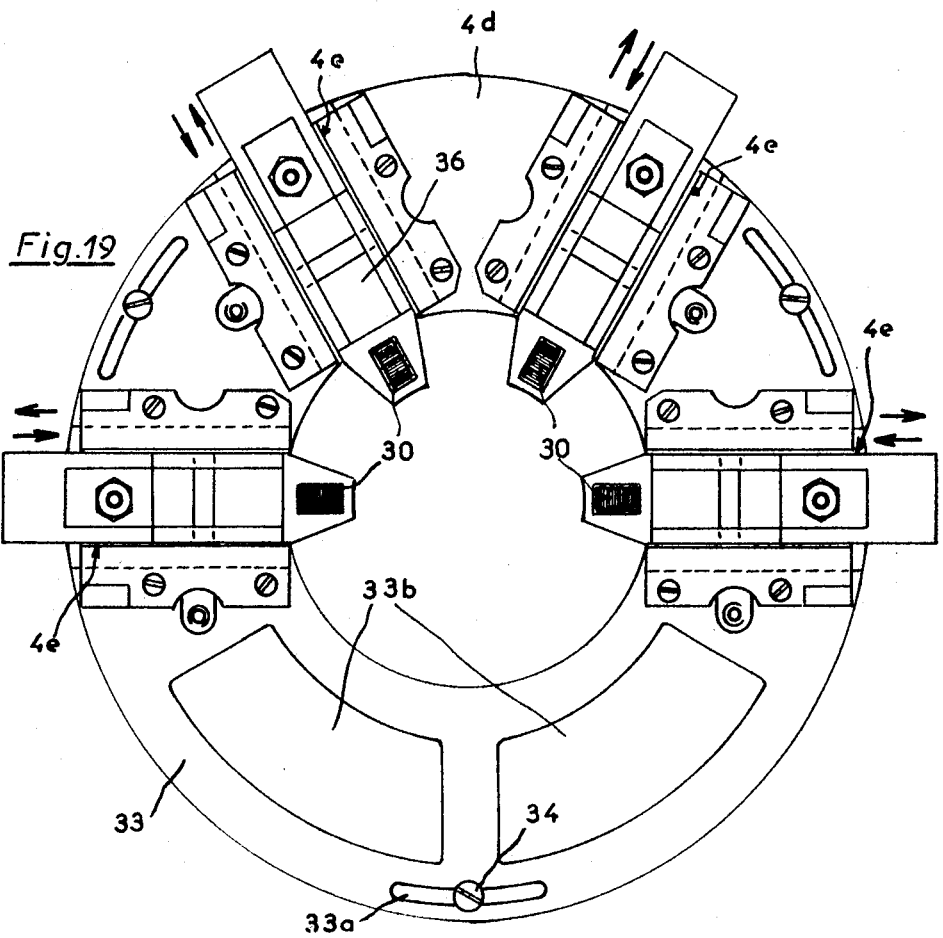
Figure 17:
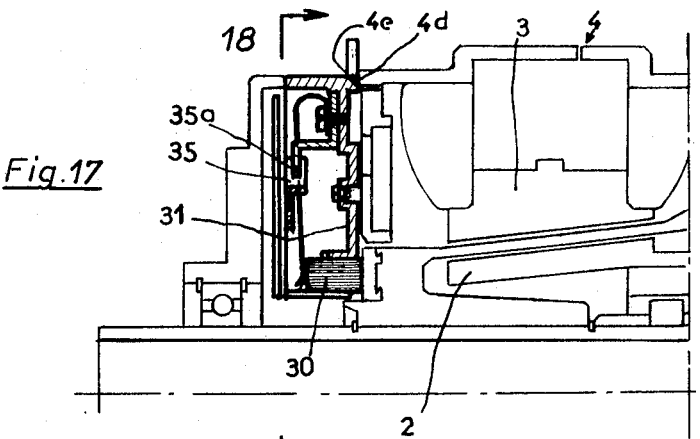
Figure 18:
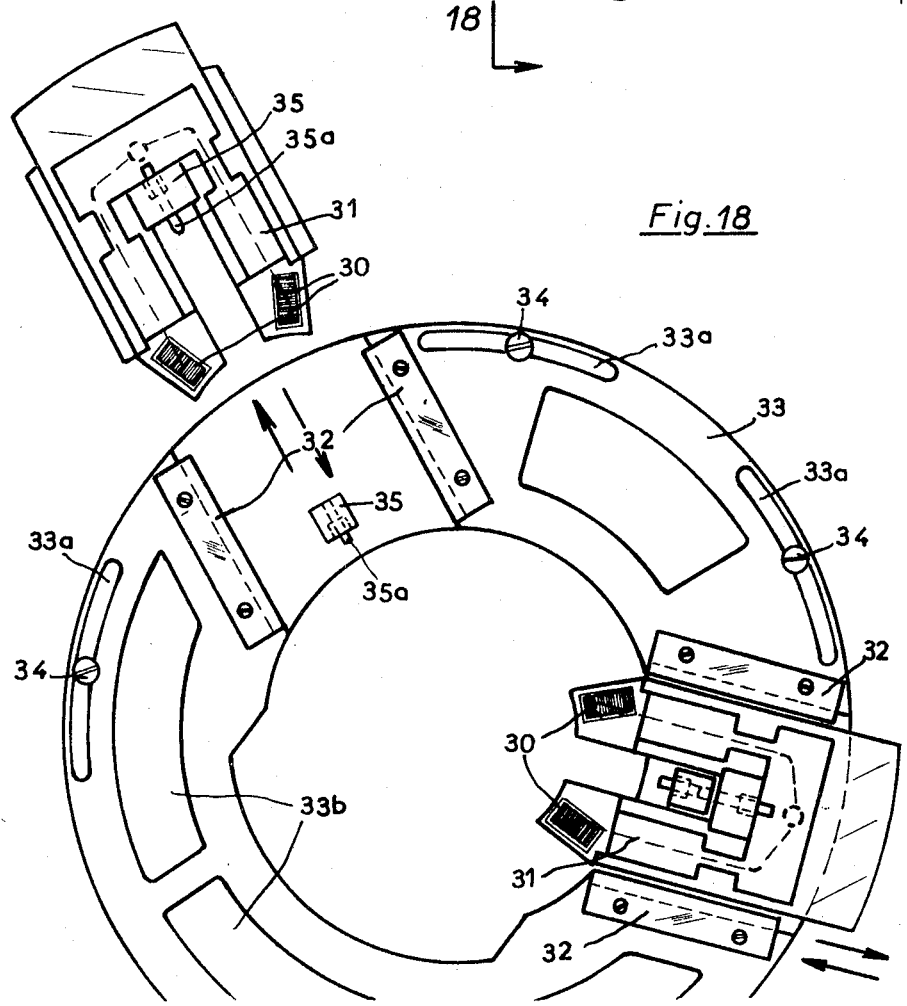
Figure 20:
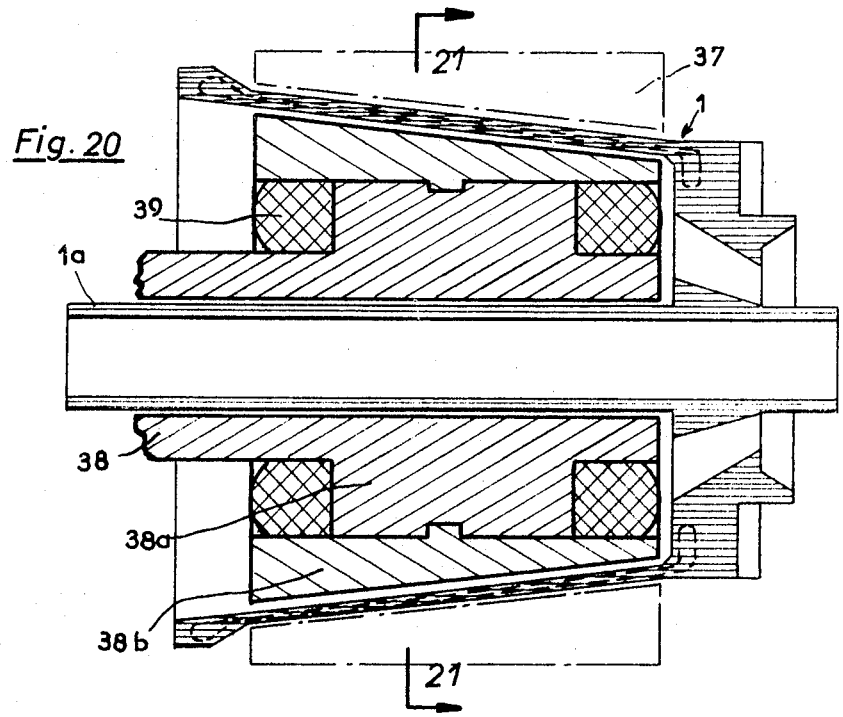
Figure 21:
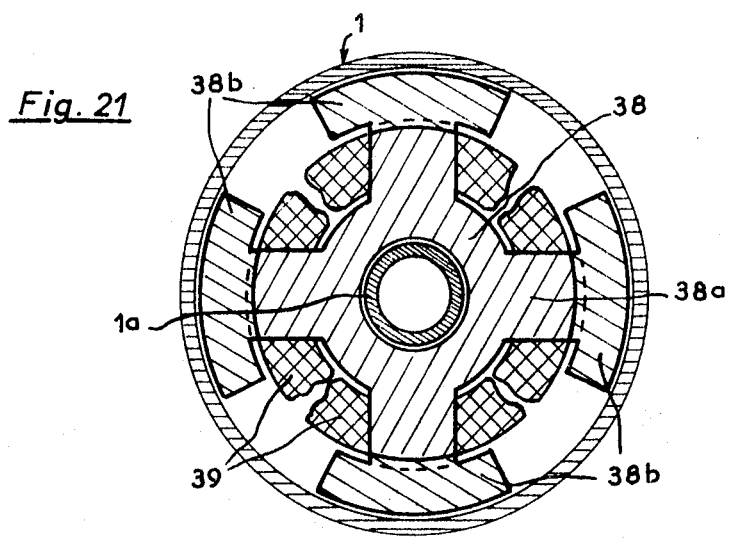
Figure 22:
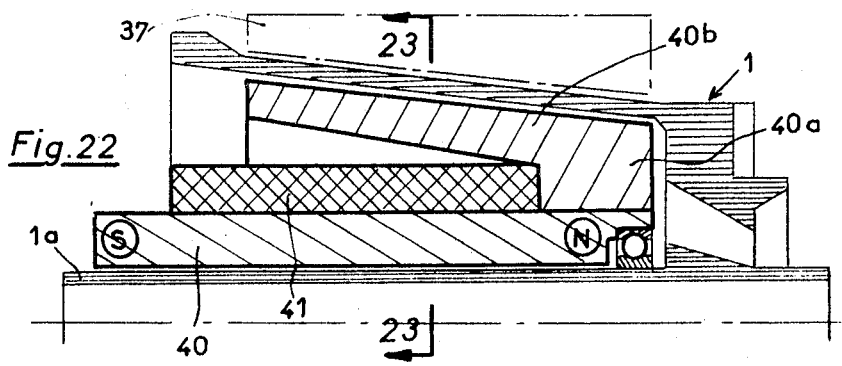
Figure 23:
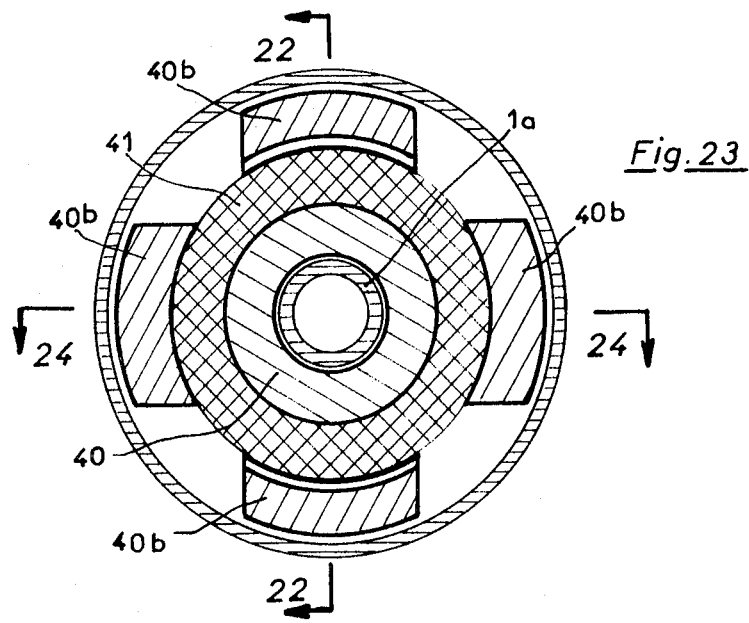
Figure 24:
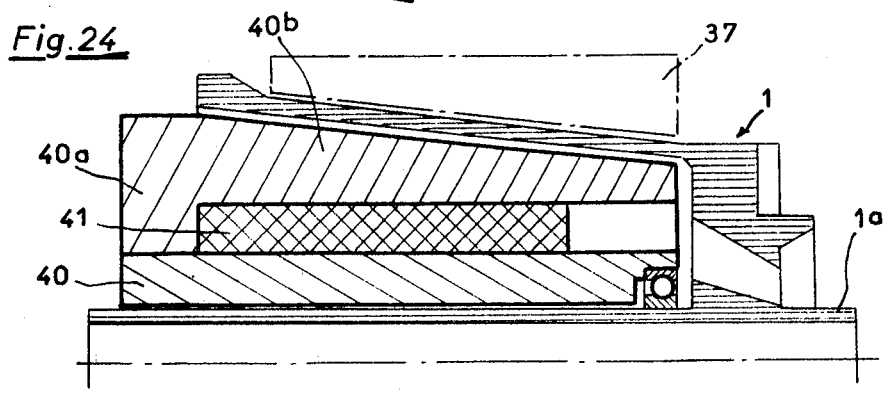

FIGS. 6, 7, 8, 9 and 10 illustrate arrangements for strengthening the rotor of a motor as described with reference to any of the preceding figures, FIG. 6 being an axial section and FIGS. 7, 8 and 9 showing views of alternative constructional forms taken along the enlarged portion 7—7 of FIG. 6;

FIG. 10 shows a fragmentary transverse section taken along the line 10—10 of FIG. 6;

FIG. 11 is an axial half-section illustrating means for ventilating and cooling a motor as described with reference to any of the preceding figures;

FIG. 12 shows a fragmentary transverse section taken along the line 12—12 of FIG. 11;

FIG. 13 is a fragmentary axial half-section through a combination of a motor as described with reference to any of the preceding figures and including a subsidiary motor;

FIGS. 14, 15 and 16 illustrate arrangements and means for reinforcing the sleeve or central part of the rotor of a motor as described with reference to any of the preceding figures;

FIG. 17 is a longitudinal axial section through the motor as described with reference to any of the preceding figures and provided with a detachable brush holder system;

FIG. 18 is a transverse section taken along the line 18—18 of FIG. 17;

FIG. 19 is a transverse view illustrating a modification of the embodiment of FIG. 17;

FIG. 20 is an axial section through a motor as described with reference to any of the preceding figures and showing a modification to the internal part of its magnetic circuit;

FIG. 21 is a transverse section taken along the line 21—21 of FIG. 20;

FIG. 22 is an axial section taken along the line 22—22 of FIG. 23 through a modification of the motor of FIG. 20;

FIG. 23 is a transverse section taken along the line 23—23 of FIG. 22;

FIG. 24 is an axial section taken along the line 24—24 of FIG. 21, through a sectional plane perpendicular to the sectional plane of FIG. 22.

Figure 25:
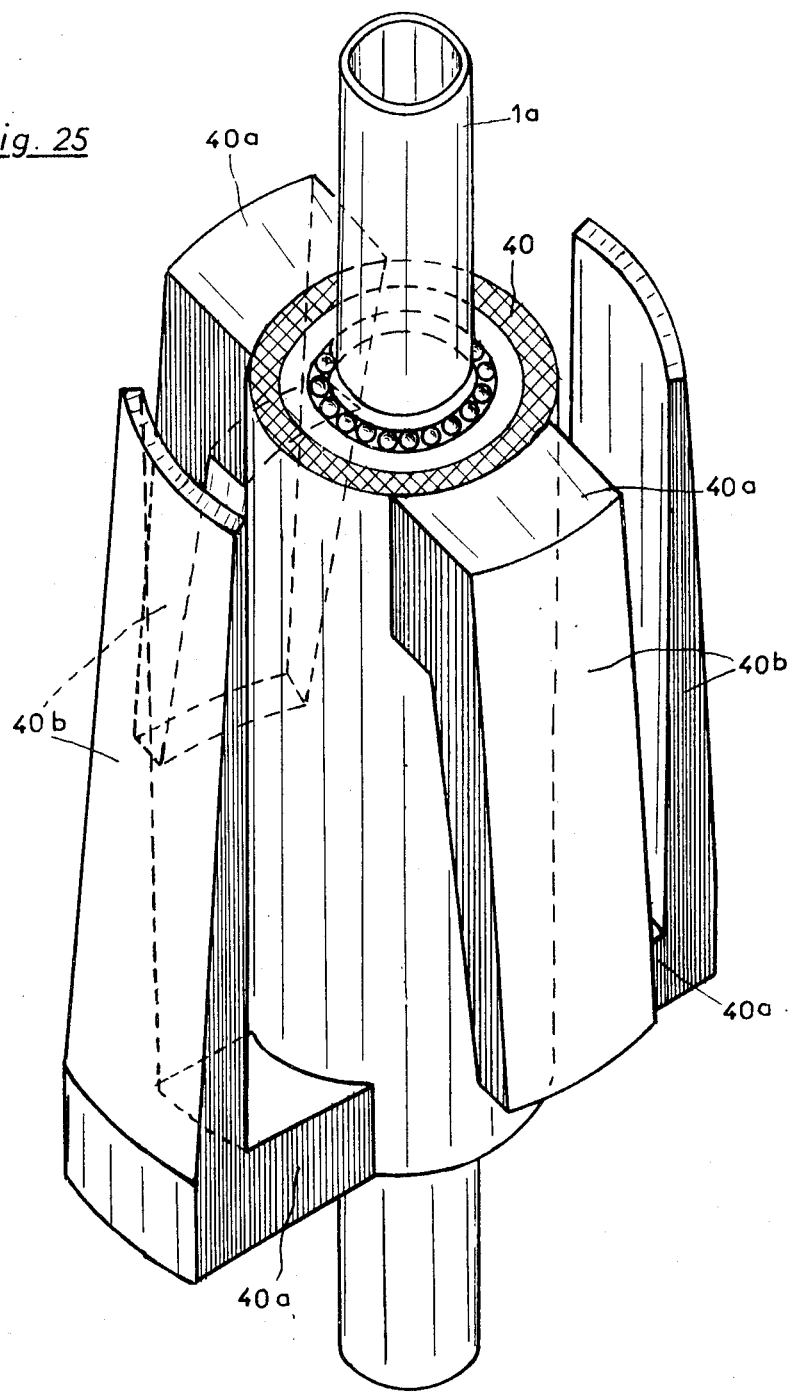

FIG. 25 is a view in perspective of the internal part of the stator of this form of construction.

Figure 1:
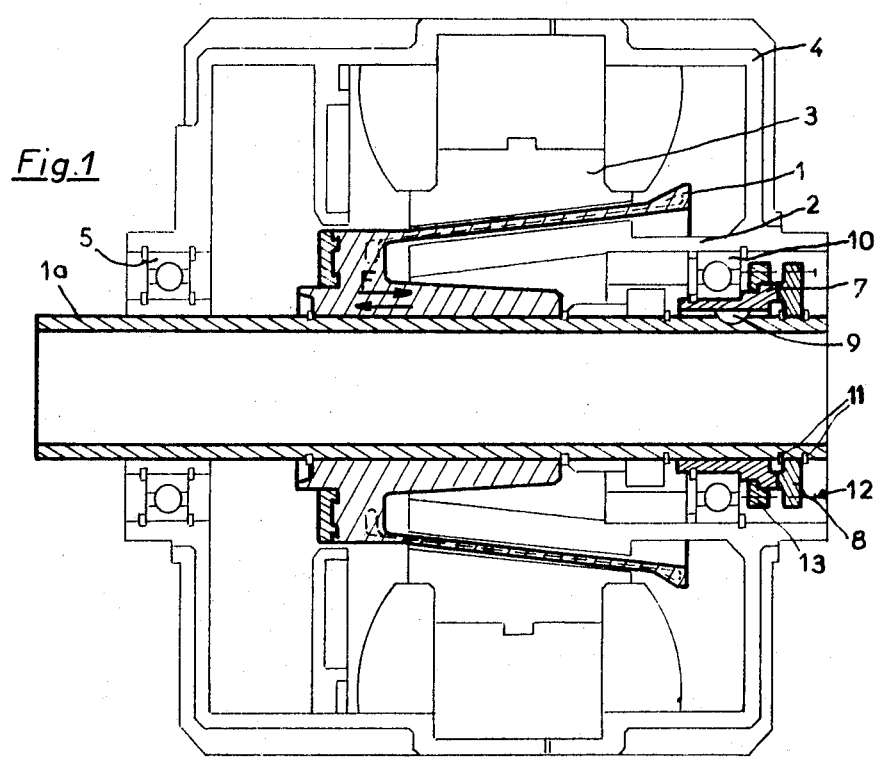
FIG. 1 is a general diagrammatic view in elevation and in axial section of one form of motor with means for adjusting the position of the rotor relative to the stator.

A DC commutator motor is illustrated in cross section in FIG. 1 which shows a frustoconical rotor 1 constructed in accordance with the features of the aforesaid patent.

This rotor is secured on a sleeve 1a both angularly and in the axial direction. Alternatively, the sleeve may be formed integrally with the rotor.

The machine stator is composed of an internal part 2 and an external part 3. The internal part 2 may be rotatable but is regarded herein as part of the stator as it provides a portion of the magnetic circuit in which the rotor 1 rotates. The whole arrangement is enclosed in a frame 4 consisting of a number of detachable parts. Bearing means 5 and 10 rotatably attach the rotor to the frame.

Provision is also made to adjust with precision the position of the rotor 1 relative to the internal and external parts of the stator.

For this purpose, two rings 7 and 8, intended to cooperate, are mounted around the sleeve 1a. The ring 7 is secured angularly relative to the sleeve 1a, in this example by means of a key 9. In the axial direction, the ring 7 is free in relation to the sleeve 1a but secured relative to the part 3 and the fixed frame 4, in this case through the bearing 10 secured axially in relation to the bearing surface of the frame 4.

The ring 8 is axially fixed on the sleeve 1a, in this example between two resilient washers 11 engaged in peripheral circular grooves in the sleeve.

Figure 2:
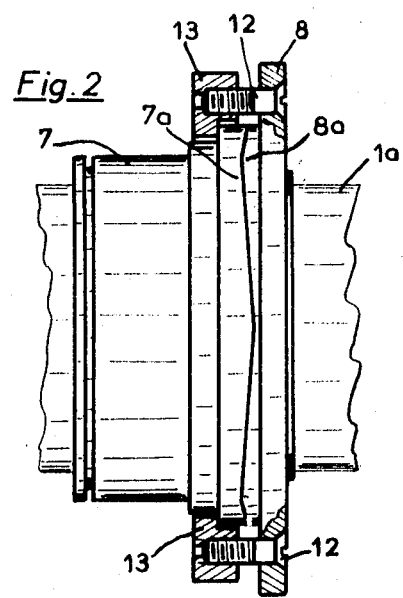
FIGS. 2 and 3 illustrate to a larger scale two different positions of the adjusting means illustrated in FIG. 1.
Figure 3:
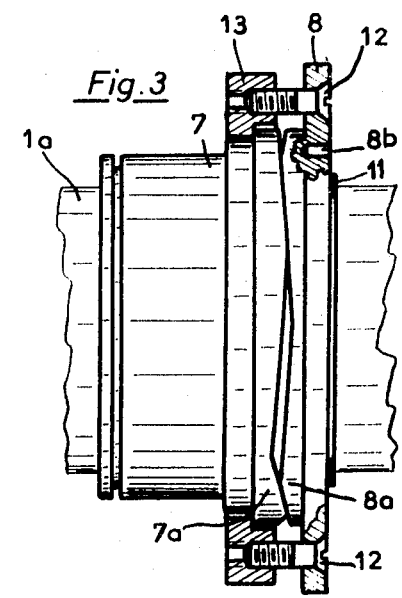

As shown in FIGS. 2 and 3, the rings 7 and 8 have inclined surfaces 7a and 8a respectively formed on the juxtaposed faces of the rings 7 and 8. These rings may be held securely together in a chosen angular position. In the illustrated embodiment, they are secured by means of screws 12 passing through the ring 8 cooperating with screw-threaded holes in a ring 13 keyed against a shoulder on the ring 7.

It will be appreciated that the relative angular displacement of surfaces 7a and 8a, being in effect surface cams, will permit the axial position of the sleeve 1a and the rotor 1 to be adjusted with precision. This adjustment can be achieved in both directions, as indicated by the arrows F. The ring 8 may be formed with holes 8b or other means permitting it to be driven. Graduations and a pointer (not shown) mounted on the ring 8 and the sleeve may be provided for precisely checking the position adjustment.

FIG. 4 illustrates other means for adjusting the axial position of the sleeve 1a and of the rotor 1.

Two groups of thin washers or shims 14 and 15 are mounted around the sleeve 1a and at one side of members having a fixed axial position in relation to the frame 4 and to the parts 2 and 3 of the stator. These axially fixed members include in this case a bearing 16 and the axial bearing 17a of a fan 17.

It will be appreciated that one or more of these washers may be transferred from one group to the other by a simple detachment, with a corresponding adjustment, in the directions of the arrows F, of the axial position of the sleeve 1a and of the rotor 1.

The adjustment of the airgap itself, i.e., the clearance between the parts 2 and 3 of the stator, may be readily effected as illustrated in FIG. 5. An appropriate number of thin washers or shims 18 are interposed between assembly faces 2a of the internal part 2 of the stator, and 4a of the frame 4. Adjustment is thus obtained by increasing or reducing the number of such washers.

In some cases, the internal part 2 of the stator may be fast with the rotor and with its sleeve, so that the airgap is simultaneously adjusted with the position of the rotor.

Motors having a frustoconical rotor in accordance with the features of the aforementioned patent are designed to have very rapid accelerations and decelerations and to rotate in a very wide speed range, notably at high speeds. The moulded rotor having a reduced thickness, it is important to ensure that it is rigid and will resist the high centrifugal forces which tend to deform it and to bring it into contact with the external part 3 of the stator.

To this end, the binding arrangements illustrated in FIGS. 6 to 10 are proposed. FIG. 6 shows the moulded rotor 1 with rotor windings 1b. In accordance with the construction of FIG. 7, filaments consisting of cotton, glass, enamelled steel, etc., are peripherally wound at 19 and internally wound at 20. These filaments are moulded in the plastics coating of the windings 1b.

FIG. 8 shows the same peripheral and internal windings 19 and 20 respectively, with a reinforcement of the internal winding 20 by means of transverse connecting filaments 21. The internal and external windings 20 and 19 respectively may be combined and to some extent braced by means of filaments such as 22 by which they are alternately connected (FIG. 9). According to FIG. 10, the binding may be simply effected by means of filaments 23 which traverse successive groups of the conductor wires of the rotor windings by traversing the winding 1a at intervals.

In addition, the motors described above are preferably operated to avoid an excessive increase in temperature, which might modify the characteristics of the material of the rotor by producing deformation, loss of performance and other undesirable effects.

To this end, we provide arrangements which form a number of ventilation paths or circuits within the motor, more particularly on either side of the rotor 1 and of the internal part 2 of the stator. Such arrangements are illustrated in FIGS. 11 and 12.

The ends of the elements of the frame 4 are formed with appropriately shaped apertures 4b, such as around the fan 17, and at 4c in internal partitions which may be provided in the said frame.

The left-hand end of the rotor is also formed with apertures extending therethrough at 1e.

One the other hand, the internal part 2 is constructed in two parts, 2b and 2c fitted one within the other. Either one or both of the contacting faces of these two parts is or are formed with rectilinear or curved grooves such as 2d extending from one end to the other of the parts.

Such grooves are also present at 2e in the periphery of the external part 2c of the internal part 2 of the stator. In this way, the free air circulation volume between the stator and the rotor is increased, and the cooling of these two parts is accelerated.

The cooling paths are shown not only around the rotor (indicated by short arrows), but also within the rotor, in the body of and below the internal part 2 (indicated by long arrows). The blades of the fan 17 activate the airflow along these paths.

The cooling is improved and rendered suitable for all speeds of the motor, even at standstill, by the features illustrated in FIG. 13.

In this case, an additional frame portion 26 is fitted to or forms part of the frame 4.

Mounted in the volume defined by the frame portion 26 is a second motor which may be of the same type and which is denoted generally at 27. This motor has reduced overall dimensions, notably by virtue of its very wide-angled conical rotor 28, which is designed in accordance with the aforementioned patent. The sleeve 28a of the rotor is rotatably supported by means of a bearing connected to a bearing surface of the frame portion 26 without contacting and independently of the sleeve 1a. The blades of a fan 29 are secured to a bearing surface of the sleeve 28a.

These means, either alone or in combination with the preceding means relative to the cooling paths, ensure an effective forced cooling of the motor even if it rotates at low speed or is stopped under load. Any dangerous heating can thus be avoided.

It will be recalled that spindle motors, and more particularly those referred to in the aforementioned patent, in which the rotor is situated directly around a driven or utilization shaft, present the problem of adaptation and integral mounting of the rotor 1 on the sleeve 1a. It will be recalled that the driven or utilization shaft (not shown) is engaged in the sleeve 1a.

As illustrated in FIGS. 14, 15 and 16, a bush 24 (FIG. 15) is directly secured in the axial bearing portion 1c of the rotor 1 during the assembly of the rotor.

This bush is formed with regularly distributed slots 24a, which are preferably helical and which do not open at the ends of the bush, or at least at one of said ends. The bush can thus be resiliently and radially deformed without ceasing to act as a reinforcing element. The number of slots is so chosen as to obtain these properties.

To assemble the bearing portion 1c and the bush 24, a lattice-form bush 25 is peripherally secured to the bush 24 by spot welding or the like, before the moulding of the rotor. This lattice-form bush does not deprive the bush 24 of its ability to undergo radial resilient deformation, which is obviously limited.

After the moulding of the rotor and of the bushes 24 and 25, the bush 24 is bored to a dimension such that the sleeve 1a may be firmly assembled with the rotor as a force fit in the bush 24, the latter being capable of undergoing and absorbing a radial expansion. Alternatively, the sleeve may be rigidly fitted in the bush by other means.

It will be appreciated that these features have the advantage that they make it possible to change the sleeve where necessary, for example to adapt the motor to utilization shafts of different dimensions. The manufacture is also rendered more rational and more economical, since bushes 24 having bores of different dimensions may be adapted for a single rotor mould.

It will also be appreciated that the sleeve 1a may be made fast with the bush 24 before the latter is integrally moulded with the rotor.

The aforesaid patent describes arrangements in which a sliding member carrying all the brushes which cooperate with the blades 1d of the commutator is so mounted as to be radially removable in slideways in a corresponding support provided in the motor.

These arrangements have been improved as illustrated in FIGS. 17 and 18 and in FIG. 19.

FIGS. 17 and 18 show an arrangement in which brushes 30, in this case four, are mounted in pairs on sliding members 31. The latter are positioned between slideways 32 on a support plate 33 secured against an inner frame partition 4d.

For this purpose, screws 34 are passed through apertures in sectors 33a of the plate 33 so as to permit an angular adjustment of the brush holder assembly to find the exact switching plane.

In the positioning of the sliding members 31, pins 35a penetrate members 35 to establish the necessary connections.

The plate 33 is also formed with lightening apertures 33b to permit flow of cooling air.

In the arrangement shown in FIG. 19, brushes 30 are mounted on respective radially removable sliding members 36 in arrangement similar to those just described.

In all cases, the frame 4 is formed with radial apertures 4e to enable the sliding members and their brushes to be positioned and withdrawn.

These arrangements are more convenient to construct than those disclosed in the aforementioned patent. It is easier to check the brushes and to replace them without having to stop the motor.

A change is also made with regard to the construction of the stator in that the induced field is produced by permanent magnets or by wound arrangements which are situated within the rotor 1, while an outer ring 37 (represented by chain dotted lines in FIGS. 20, 22, 24) is provided to complete the magnetic circuit. It is to be noted that this ring may be incorporated in the frame of the motor and may also perform the function of the frame.

A construction embodying this feature, and which may incorporate features already described, is illustrated in FIGS. 20 and 21, showing an internal stator core 38 mounted inside the rotor 1 with an appropriate spacing between the latter and the sleeve 1a.

In the illustrated example, the core 38 is of cruciform section (FIG. 21), having arms 38a and four pole extensions or pieces 38b. The arms 38a carry windings 39.

Another embodiment of this feature, and which may incorporate features already described, is illustrated in FIGS. 22 to 25, showing the rotor 1 and the sleeve 1a fast with the said rotor.

Fixedly mounted around the sleeve 1a, but independent thereof, is a tubular core 40 surrounded by a cylindrical ring coil 41. The coil 41 sets up a North (N) magnetic pole and a South (S) magnetic pole as illustrated at the ends of the core 40.

The core 40 is integrally formed with, or fitted to, opposed L-shaped arms which extend radially at 40a and then longitudinally at 40b. In the illustrated, nonlimiting example, there are four arms providing opposed pairs. One pair of the arms extends radially at one end of the core 40, while the other pair extends radially at the other end of the core 40. This arrangement is illustrated in the perspective view of FIG. 25.

The single-coil core may alternatively be applied to the external ring 37.

In any case, this construction of the internal or external stator affords the advantage of simplifying the construction, and notably of reducing the amount of copper required. The simplification is obvious, since there is only one, cylindrical, coil 41. This coil may be replaced by a single tubular permanent magnet in the case of a permanent-magnet construction.

I claim:

1. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular frustoconical airgaps between, respectively, the outer stator portion and the rotor, and between the inner stator portion and the rotor, the improvement comprising:

a. means for adjusting the axial position of said rotor relative to said outer and inner stator portions, said adjusting means including 1. a first member positioned on said rotor shaft and restrained against angular movement relative to said rotor and against axial movement relative to said stator, said member having a camming surface portion inclined relative to the axis of rotation of said rotor, and 2. a second member positioned on said rotor shaft angularly movable relative to said rotor and restrained against axial movement relative to said rotor, said member having a camming surface inclined relative to said axis of rotation, the camming surfaces of said first and second members being juxtaposed whereby angular movement of said members with respect to each other varies the relative axial position of said rotor and stator portions so as to correspondingly vary the size of said airgaps; and b. means for securing said members against relative angular motion in any of a plurality of angularly displaced positions.

2. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular frustoconical airgaps between, respectively, the outer stator portion and the rotor, and between the inner stator portion and the rotor, the improvement comprising:

means for adjusting the axial position of said rotor relative to said outer and inner stator portions, said adjusting means including two groups of interchangeable shims positioned in predetermined spaced relationship along said rotor shaft and fixed axially relative to said stator, said shims being removable to permit displacement of one shim from one of said groups into the other group to vary the relative axial position of said rotor and said stator portions so as to effectively vary the size of the airgaps therebetween.

3. A dynamoelectric motor as claimed in claim 2 wherein said rotor is formed of a moulded insulating plastic material; rotor windings embedded in said insulating material, and at least one binding filament wound at an angle to the conductors of said windings and binding said rotor at at least one side of said windings, said binding peripherally encompassing the frustoconical portion of said rotor so as to provide a reinforcing hoop member resisting deformation of said rotor position.

4. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular-frustoconical airgaps between, respectively, the outer stator portion and the rotor, and between the inner stator portion and the rotor, said rotor being formed of a moulded insulating plastic material; rotor windings embedded in said insulating material, and at least one binding filament wound at an angle to the conductors of said windings and binding said rotor at at least one side of said windings, said binding peripherally encompassing the frustoconical portion of said rotor so as to provide a reinforcing hoop member resisting deformation of said rotor portion, said rotor being hollow and apertured to provide a ventilation path within said rotor; and a fan for producing ventilation currents around and within said rotor.

5. A dynamoelectric motor as claimed in claim 4, wherein said at least one filament extends at both sides of said conductors.

6. A dynamoelectric motor as claimed in claim 4, comprising at least one further filament which interlaces said at least one filament at both sides of said conductors.

7. A dynamoelectric motor as claimed in claim 4, comprising at least one further filament which interlaces said at least one filament at the internal side of said conductors.

8. A dynamoelectric motor as claimed in claim 4, wherein said one filament binds said conductors by interlacing said conductors and crossing said conductors at intervals.

9. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular-frustoconical airgaps between, respectively, the outer stator portion and the rotor, and between the inner stator portion and the rotor, said rotor being formed of a moulded insulating plastic material; rotor windings embedded in said insulating material, and at least one binding filament wound at an angle to the conductors of said windings and binding said rotor at at least one side of said windings, said binding peripherally encompassing the frustoconical portion of said rotor so as to provide a reinforcing hoop member resisting deformation of said rotor portion, a bushing about which said rotor is moulded, said bushing being radially deformable; and a drive member adapted to be received in said bushing.

10. A dynamoelectric motor as claimed in claim 9, wherein said drive member comprises a drive sleeve force fitted into said bushing.

11. A dynamoelectric motor as claimed in claim 10, wherein said drive sleeve is fitted into said radially deformable bushing before said bushing has been molded to said rotor-insulating material.

12. A dynamoelectric motor as claimed in claim 10, wherein said drive sleeve is fitted into said radially deformable bushing after said bushing has been molded to said rotor-insulating material.

13. A dynamoelectric motor as claimed in claim 9, wherein the bushing has regularly distributed slots, the ends of said slots being closed at at least one end of said bushing.

14. A dynamoelectric motor as claimed in claim 13, wherein said slots are of helical form.

15. A dynamoelectric motor as claimed in claim 9, comprising a lattice form bushing interposed between said rotor-insulating material and said radially deformable bushing.

16. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular frustoconical airgaps between, respectively, the outer stator portion and the rotor, and between the inner stator portion and the rotor, said stator including a housing containing apertures to provide ventilation paths within said housing; a fan for producing ventilation currents through said paths, said rotor being hollow and apertured with through bores to provide at least one of said ventilation paths within said rotor.

17. A dynamoelectric motor as claimed in claim 16, comprising two magnetic circuit parts one within the other, both said circuit parts being located within said rotor and defining between them ventilation channels.

18. A dynamoelectric motor as claimed in claim 16, comprising a magnetic circuit portion within said rotor and at least one of the internal and external surfaces of said portion defining ventilation grooves.

19. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular frustoconical airgaps between, respectively, the outer stator portion and the rotor, and between the inner stator portion and the rotor, said rotor and stator portions defining a magnetic circuit having a first portion surrounding said rotor and a second portion within said rotor and defining with said first portion said airgaps in which said rotor is rotatable; and magnetic field producing means provided by said second portion and formed by a tubular magnet and two pairs of opposed L-shaped arms each having a radial portion extending substantially radially from said magnet followed by portions extending with an axial component, said radial portions of one of said pairs being at one end region of said magnet and said radial portions of the other of said pairs being at the other end region of said magnet.

20. A dynamoelectric motor as claimed in claim 19, wherein said tubular magnet is a permanent magnet.

21. A dynamoelectric motor as claimed in claim 19, wherein said tubular magnet is a tubular core provided with a single cylindrical coil.

22. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular frustoconical airgaps between, respectively, the outer stator portion and the rotor, and between the inner stator portion and the rotor, said rotor and stator portions defining a magnetic circuit having a first portion surrounding said rotor and a second portion within said rotor and defining with said first portion said airgaps in which said rotor is rotatable; and magnetic field producing means provided by said second portion, said second portion comprising a cruciform arrangement of radial arms, and pole pieces at the outer end of said arms, said first portion being a ring forming at least a part of a machine frame.

23. A dynamoelectric motor of the brush and collector type comprising a rotor and a stator; said stator including a fixed stator portion outside the rotor and a further stator portion inside the rotor; said rotor being mounted on a rotor shaft and including a generally frustoconical portion arranged between said outer and inner stator portions so as to provide essentially annular frustoconical airgaps between, respectively, the outer stator portion and the rotor, and between the inner stator portion and the rotor, including a cooling fan for setting up ventilation currents in said motor; and a subsidiary motor defined by a subsidiary stator and a subsidiary rotor rotatable independently of said first-mentioned motor for driving said fan, said subsidiary rotor being of cylindrical tapering form to have an axial extent small in comparison with that of said first rotor.

* * * * *